United States Patent
Zhang

(10) Patent No.: US 9,854,193 B2
(45) Date of Patent: Dec. 26, 2017

(54) HIGH DEFINITION CAMERA AND METHOD

(71) Applicant: Hangzhou Hikvision Digital Technology Co., Ltd., Hangzhou (CN)

(72) Inventor: Huahua Zhang, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 3 days.

(21) Appl. No.: 14/951,560

(22) Filed: Nov. 25, 2015

(65) Prior Publication Data

US 2016/0080673 A1 Mar. 17, 2016

Related U.S. Application Data

(63) Continuation of application No. PCT/CN2014/090958, filed on Nov. 13, 2014.

(30) Foreign Application Priority Data

Nov. 18, 2013 (CN) .......................... 2013 1 0580849

(51) Int. Cl.
*H04N 5/374* (2011.01)
*H04N 5/235* (2006.01)
*H04N 5/225* (2006.01)

(52) U.S. Cl.
CPC ........... *H04N 5/374* (2013.01); *H04N 5/2354* (2013.01); *H04N 5/2256* (2013.01)

(58) Field of Classification Search
CPC .... H04N 5/374; H04N 5/2354; H04N 5/2256; G03B 15/04; G03B 15/05; G03B 7/16
See application file for complete search history.

(56) References Cited

U.S. PATENT DOCUMENTS

| 2013/0002882 A1 | 1/2013 | Onozawa et al. |
| 2013/0016277 A1* | 1/2013 | Ito .......................... G02B 7/36 348/353 |
| 2013/0127348 A1 | 5/2013 | Yang |

FOREIGN PATENT DOCUMENTS

| CN | 1729682 A | 2/2006 |
| CN | 102194320 A | 9/2011 |
| CN | 102427509 A | 4/2012 |
| CN | 102879975 A | 1/2013 |
| CN | 102984455 A | 3/2013 |

(Continued)

OTHER PUBLICATIONS

International Search Report for Application No. PCT/CN2014/090958 dated Feb. 17, 2015.

(Continued)

*Primary Examiner* — Twyler Haskins
*Assistant Examiner* — Angel L Garces-Rivera
(74) *Attorney, Agent, or Firm* — Harness, Dickey & Pierce, P.L.C.

(57) ABSTRACT

A high definition (HD) camera and a method for implementing the HD camera is described. A CMOS sensor of high frame rate captures frame images and provides light to N consecutive frame images with an interval of M consecutive frame images in the captured frame images using an auxiliary light source when the auxiliary light source is on. The auxiliary light source turns on and off according to a duty cycle. The M is 0 or a positive integer. The N is a positive integer. The mechanism has good light performances, reduced deformation of moving objects, and reduced costs.

8 Claims, 5 Drawing Sheets

(56) References Cited

FOREIGN PATENT DOCUMENTS

| WO | 2004062268 A1 | 7/2004 |
|---|---|---|
| WO | 2009022153 A1 | 2/2009 |
| WO | 2013146311 A1 | 10/2013 |

OTHER PUBLICATIONS

European Search Report for Application No. 14861771.5 dated Aug. 24, 2016.
Chinese Office Action for Application No. 201310580849.6, dated Apr. 12, 2017.
European Office Action for Application No. 14 861 771.5-1902 dated Aug. 2, 2017.

* cited by examiner

HIGH DEFINITION CAMERA AND METHOD

CROSS-REFERENCE TO RELATED APPLICATIONS

This application is a continuation of International Application No. PCT/CN2014/090958, filed Nov. 13, 2014. This application claims the benefit and priority of Chinese Application No. 201310580849.6, filed Nov. 18, 2013. The entire disclosures of each of the above applications are incorporated herein by reference.

FIELD

The present disclosure relates to intelligent traffic techniques and to a high definition camera and a method.

BACKGROUND

This section provides background information related to the present disclosure which is not necessarily prior art.

With the ongoing urban security construction, the intelligent traffic industry is developing rapidly. Due to the need for capturing moving objects (e.g., vehicles) and identifying features of the moving objects (e.g., license plates and colors of vehicles), high requirements are placed on smart cameras used in traffic systems (i.e., smart traffic cameras).

The requirements for smart traffic cameras may include, for example, instant solidation capability to minimize deformation of moving objects and the capability of producing images with adequate brightness and good quality due to the need for identifying features of moving objects, which requires ample light.

Conventional smart traffic cameras may be implemented using charge coupled device (CCD) sensors together with light emitting diodes (LED) for light.

FIG. 1 is a diagram illustrating a conventional exposure mode using a CCD sensor and a conventional light mode using an LED. As shown in FIG. 1, the CCD sensor uses a global exposure mode. Exposure of all pixels in a frame image starts and ends at the same time. Charges in the pixels are transferred using a vertical charge coupled device (VCCD) and light is provided by an LED having a certain duty cycle. Supposing the readout time of each frame image (Tf) is 40 ms, i.e., the frame rate of the CCD sensor is 25 fps, and the exposure time (Ts) is 5 ms, an LED having a duty cycle of 12.5%, a high-light time of 5 ms, and a low-light time of 35 ms may be used for providing the light to each frame image. N represents the N'th frame image.

According to the above mechanism, there is little deformation of moving objects and images captured have good brightness and good quality.

CCD sensors are expensive due to the restrictions of the production process, thus, smart traffic cameras equipped with CCD sensors are very expensive, which hampers the mass deployment of such smart traffic cameras.

Therefore, another mechanism for implementing smart traffic cameras was proposed, which uses complementary metal oxide semiconductor (CMOS) sensors and constant-lit LED for light.

FIG. 2 is a diagram illustrating a conventional exposure manner of a CMOS sensor. As shown in FIG. 2, the CMOS sensor uses an exposure manner of rolling shutter, i.e., reset and readout of charges are carried out at the same time. For each row of pixels, shutter is the time difference between the start time of resetting charges (reset line) and the start time of reading out the charges (read line). For this exposure method, the light is usually provided to the whole frame image to ensure that the whole frame image is uniformly lit.

The above mechanism, however, has some deficiencies in practice. For example, the light is power-consuming, fragile, and generates excessive heat because it is constantly switched on, which impairs the light performance. Further, taking CMOS sensors having a frame rate of 30 fps as an example, under the exposure mode of rolling shutter, the time difference between the readout time of the top of a frame image and the readout time of the bottom of the frame image is the readout time of the frame image, i.e., T=1/30 s=33.3 ms. The large time difference results in large deformation of moving objects.

SUMMARY

This section provides a general summary of the disclosure, and is not a comprehensive disclosure of its full scope or all of its features.

Various embodiments of the present disclosure provide a high definition (HD) camera and a method for implementing the HD camera, which has partially reduced the deformation of moving objects and lowered costs.

The technical scheme according to various embodiments is as follows.

A method for implementing a high definition (HD) camera, comprising:

capturing plural frame images using a complementary metal oxide semiconductor (CMOS) sensor of high frame rate;

providing light to N consecutive frame images of said plural frame images with an interval of M consecutive frame images, wherein said light is provided by an auxiliary light source when the auxiliary light source is on, wherein the auxiliary light source turns on and off according to a duty cycle;

wherein the M is 0 or a positive integer, the N is a positive integer.

A high definition (HD) camera, comprising a complementary metal oxide semiconductor (CMOS) sensor of high frame rate;

the high frame rate CMOS sensor is configured to capture images, receive light provided by an auxiliary light source, wherein the light is provided to N consecutive frames with an interval of M consecutive frames in the captured images when the auxiliary light source is on, the auxiliary light source turns on and off according to a duty cycle; the M is 0 or a positive integer, the N is a positive integer.

According to the technical mechanism, images are captured by a high frame rate CMOS sensor, thus the time difference between the readout time of the top of an image and the readout time of the bottom of the image is very small, which generates very little deformation of moving objects. Some frame images are selected from images captured by the high frame rate CMOS sensor at intervals, and light is provided to the selected frame images using an auxiliary light source having a certain duty cycle when the auxiliary light source is lit. The auxiliary light source may be turned on only when it is intended to provide the light, and may be in a low-light state at other times, i.e., the auxiliary light source is not necessarily always lit, which makes the auxiliary light source more durable. The light performance is also improved since the auxiliary light source will not be broken within a short time frame. Further, the technical mechanism uses a commonly-used CMOS sensor in the exposure mode of rolling shutter, thus, the costs are low.

Further areas of applicability will become apparent from the description provided herein. The description and examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure is hereinafter further described in detail with reference to the accompanying drawings as well as embodiments so as to make the purpose, technical scheme, and merits thereof more apparent.

Figure 1:
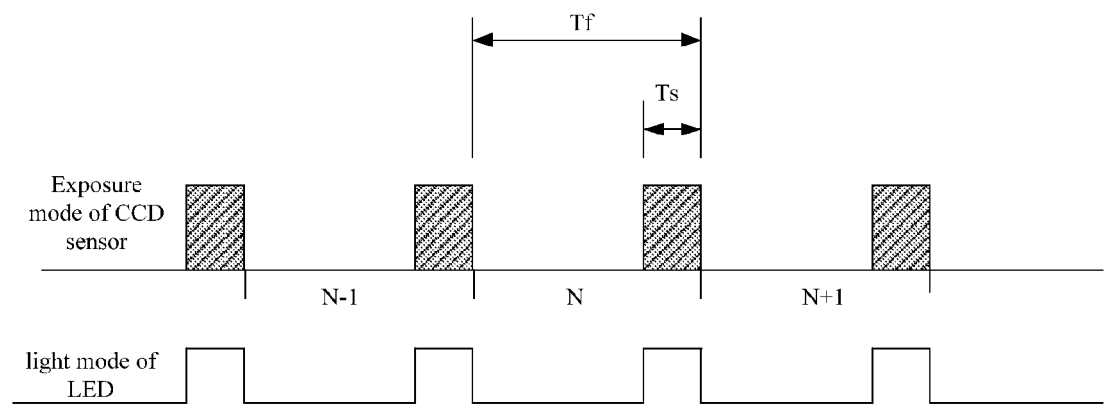
FIG. 1 is a diagram illustrating a conventional exposure manner using a CCD sensor and a conventional providing light manner using an LED according to various embodiments.
Figure 2:
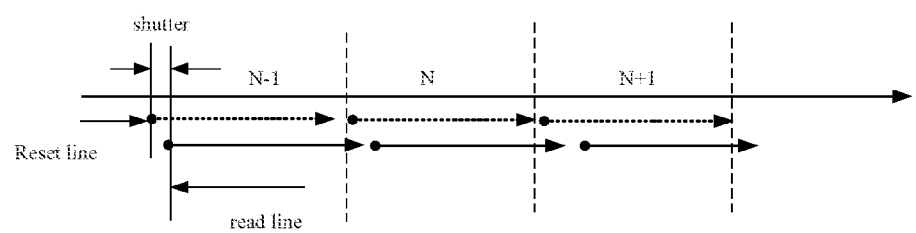
FIG. 2 is a diagram illustrating a conventional exposure manner using a CMOS sensor according to various embodiments.
Figure 3:
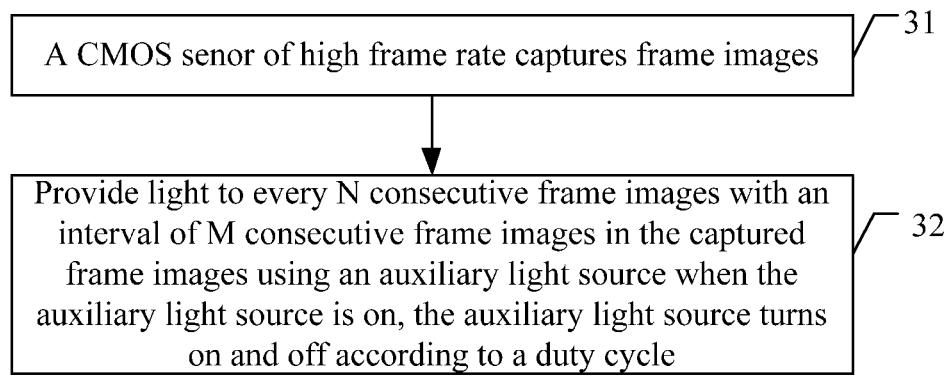
FIG. 3 is a flowchart illustrating a method of implementing an HD camera according to various embodiments.

FIG. 3 is a flowchart illustrating a method of implementing an HD camera according to various embodiments of the present disclosure. As shown in FIG. 3, the method may include the following procedures.

Block 31: Images are captured using a high frame rate COMS sensor.

The high frame rate CMOS sensor generally refers to a CMOS sensor having a frame rate larger than or equal to 50 fps under a phase alternating line (PAL) mode or a CMOS sensor having a frame rate larger than or equal to 60 fps under a national television standards committee (NTSC) mode. The frame rate used may be determined according to various situations.

Block 32: Light is provided to every N consecutive frame images with an interval of M consecutive frame images in the captured images using an auxiliary light source having a duty cycle when the auxiliary light source is lit.

The M is 0 or a positive integer, the N is a positive integer. The values of M and N may be determined according to various situations.

According to various embodiments, the auxiliary light source is an LED.

According to various embodiments, the light may be provided to a region of interest in each frame image instead of to the whole frame image, because usually only a part in each frame image captured is of interest. According to various embodiments, the region of interest may be determined manually according to the application scenario and experience or according to an analysis result obtained from a video, e.g., determining the range of movement of the target object using a moving target detection algorithm or according to the range that can be illuminated by the auxiliary light source.

According to various embodiments, the area that needs the light may include only a few rows instead of the whole frame image, i.e., T/T'<1, T denotes the time of providing the light to the region of interest, T' denotes the time of providing the light to the whole frame image, i.e., the readout time of the whole frame image, and T/T'≠1 indicates that the light is provided to the whole frame image.

According to various embodiments, one auxiliary light source or plural auxiliary light sources may be used for providing the light to the region of interest in each frame image according to the length of time when the auxiliary light source is lit. Alternatively, plural sub light sources in an auxiliary light source may be used to provide the light. The following manners may be adopted.

1) An auxiliary light source may be used to provide the light to the region of interest in each frame image.
2) P auxiliary light sources may be turned on in turn to provide the light to the region of interest in each frame image.

P is a positive integer larger than 1. The P auxiliary light sources may have the same or different light time (which refers to the length of time during which an auxiliary light source is on). According to various embodiments, the P auxiliary light sources may have the same light time.

3) P sub light sources in an auxiliary light source (e.g., for an auxiliary light source, which includes P lamp beads, where each lamp bead is regarded as a sub light source) may be turned on in turn to provide the light to the region of interest in each frame image.

Similarly, P is a positive integer larger than 1. The P sub light sources may have the same or different light time. According to various embodiments, the P sub light sources have the same light time.

It may be determined according to various situations as to which of the above manners is used.

Figure 4:
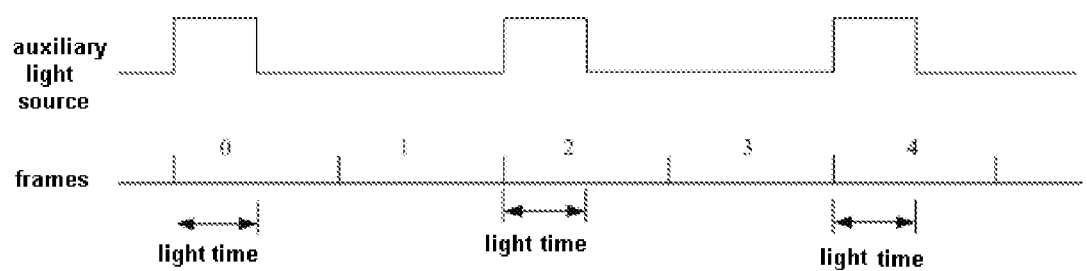
FIG. 4 is a diagram illustrating a method of providing light according to various embodiments.

FIG. 4 is a diagram illustrating a method of providing light according to various embodiments of the present disclosure.

As shown in FIG. 4, suppose the value of M is 1, the value of N is 1, i.e., providing light to 1 frame image in every 2 frame images. For illustration purposes, frame images are numbered as 0, 1, 2, 3 from left to right, the frame images that need the light are frame image 0, frame image 2, frame image 4 . . . .

Supposing the frame rate of the high frame rate CMOS sensor is 100 fps, the readout time of each frame image is $\frac{1}{100}$ s=10 ms.

Supposing the time of providing light to the region of interest in each frame image is 5 ms and the positions of the light time are as shown in FIG. 4, an auxiliary light source having a duty cycle of 25% with a light time of 5 ms and a low-light time of 15 ms may be used to provide the light to the region of interest in each frame image.

The light time 5 ms of the auxiliary light source is merely an example. An auxiliary light source with a longer light time can also be used in the example to provide light to the region of interest in each frame image, but may cause some waste of the light source.

Figure 5:
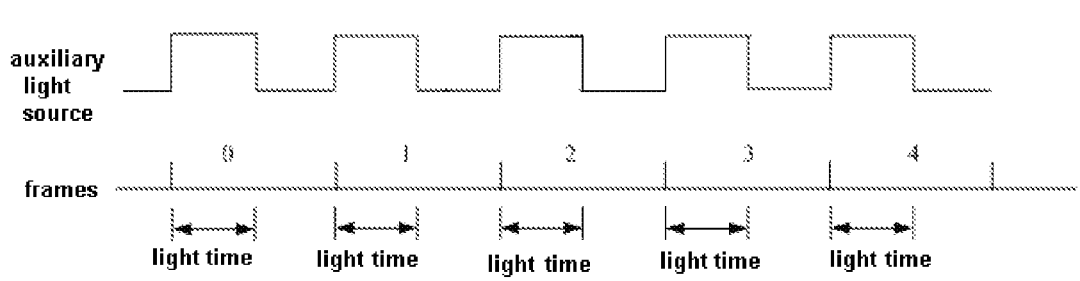
FIG. 5 is a diagram illustrating a method of providing light according to various embodiments.

FIG. 5 is a diagram illustrating a method of providing light according to various embodiments of the present disclosure.

As shown in FIG. 5, suppose the value of M is 0, i.e., each frame image needs the light. For description purposes, the frame images are numbered as 0, 1, 2, from left to right.

Supposing the frame rate of the high frame rate CMOS sensor is 50 fps, the readout time of each frame image is 1/50 s=20 ms.

Supposing the time of providing light to the region of interest in each frame image is 10 ms and the positions of the light time are as shown in FIG. 5, an auxiliary light source having a duty cycle of 50% with a light time of 5 ms and a low-light time of 15 ms may be used to provide the light to the region of interest in each frame image.

The auxiliary light source having a light time of 10 ms is merely an example. An auxiliary light source having a longer light time may also be used in the example.

Figure 6:
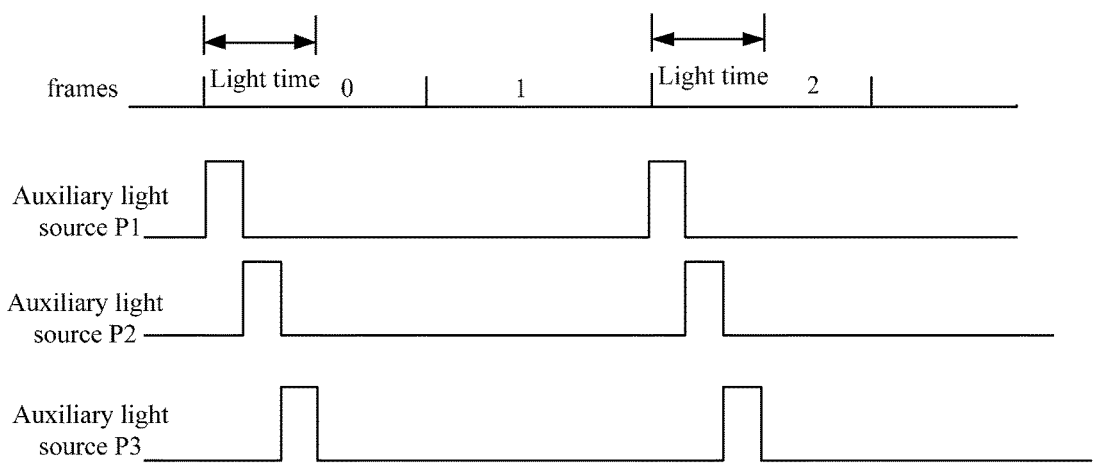
FIG. 6 is a diagram illustrating a method of providing light according to various embodiments.

FIG. 6 is a diagram illustrating a method of providing light according to various embodiments of the present disclosure.

As shown in FIG. 6, suppose the value of M is 1, the value of N is 1, i.e., providing light to 1 frame image in every 2 frame images. For illustrative purposes, the frame images are numbered as 0, 1, 2, 3 from left to right, frame images that need the light are frame image 0, frame image 2.

Supposing the frame rate of the high frame rate CMOS sensor is 100 fps, the readout time of each frame image is 1/100 s=10 ms.

Supposing the time of providing light to the region of interest in each frame image is 5 ms and the positions of the light time are as shown in FIG. 6, three auxiliary light sources each having a light time of 1.67 ms may be turned on in turn to provide the light to the region of interest in each frame image. For illustrative purposes, the three auxiliary light sources are referred to as P1, P2 and P3, and the light time of each of P1, P2 and P3 may be 5 ms/3=1.67 ms.

The 1.67 ms is merely an example. An auxiliary light source having a longer light time may also be used.

According to various embodiments, the manner of providing the light to the region of interest in each frame image using P auxiliary light sources which switch on in turn may be as follow. First, in two auxiliary light sources which turn on successively, a first auxiliary light source may be turned on by a first square wave pulse signal. When first the square wave pulse signal ends, a second auxiliary light source may be turned on by a second square wave pulse signal. Second, in two auxiliary light sources which turn on successively, a first auxiliary light source may be turned on by a first sine wave pulse signal, and a second auxiliary light source may be turned on by a second sine wave pulse signal when there is a first pre-set length of time before the first sine wave pulse signal ends.

Likewise, the method of providing the light to the region of interest in each frame image using an auxiliary light source including P sub light sources which switch on in turn may be as follow. First, in two sub light sources which successively turn on, a first sub light source may be turned on by a first square wave pulse signal. When the first square wave pulse signal ends, a second sub light source may be turned on by a second square wave pulse signal. Second, in two successively turned on sub light sources, a first sub light source may be turned on by a first sine wave pulse signal, and a second sub light source may be turned on by a second sine wave pulse signal when there is a first pre-set length of time before the first sine wave pulse signal ends.

In practice, the sine wave pulse signal may be directly generated or a square wave pulse signal is generated and then converted into a sine wave pulse signal.

According to the latter method, the method of turning on a first auxiliary light source by a first sine wave pulse signal and turning on a second auxiliary light source by a second sine wave pulse signal when there is a first pre-set length of time before the former sine wave pulse signal ends may include generating a first square wave pulse signal, converting the first square wave pulse signal into a first sine wave pulse signal, turning on the first auxiliary light source using the first sine wave pulse signal; generating a second square wave pulse signal after a second pre-set length of time since the first square wave pulse signal ended, converting the second square wave pulse signal into a second sine wave pulse signal, and turning on the second auxiliary light source using the second sine wave pulse signal, the width of the sine wave pulse signal is the sum of the width of the square wave pulse signal and the first pre-set length of time and the second pre-set length of time.

Similarly, the method of turning on a first sub light source by a first sine wave pulse signal and turning on a second sub light source by a second sine wave pulse signal when there is a first pre-set length of time before the first sine wave pulse signal ends may include generating a first square wave pulse signal, converting the first square wave pulse signal into a first sine wave pulse signal, turning on the former sub light source using the first sine wave pulse signal, generating a second square wave pulse signal after a second pre-set length of time since the first square wave pulse signal ended, converting the second square wave pulse signal into a second sine wave pulse signal, and turning on the second sub light source using the second sine wave pulse signal, the width of the sine wave pulse signal is the sum of the width of the square wave pulse signal and the first pre-set length of time and the second pre-set length of time.

The first pre-set length of time and the second pre-set length of time may be determined according to various situations.

Figure 7:
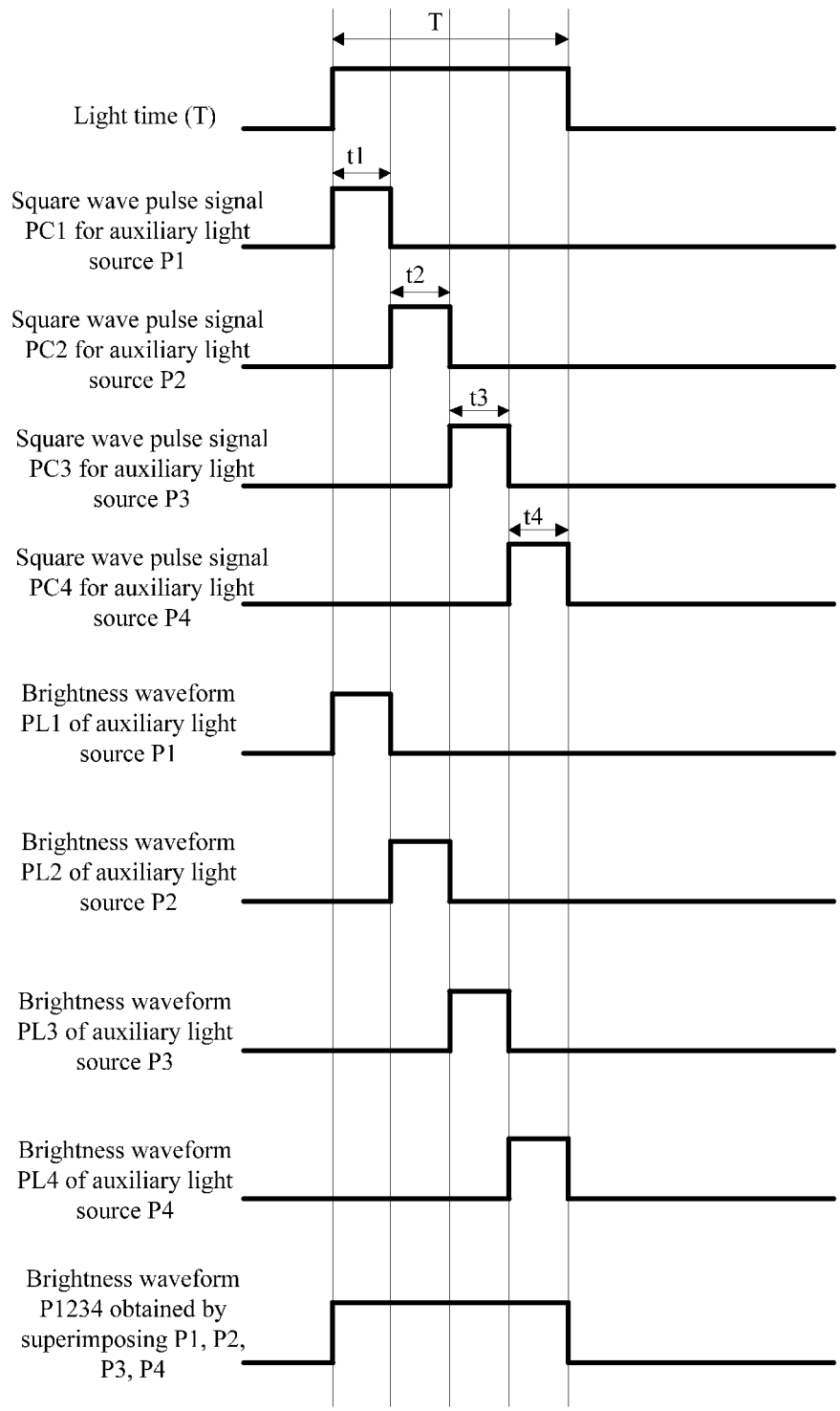
FIG. 7 is a diagram illustrating a method of providing light according to various embodiments.

FIG. 7 is a diagram illustrating a method of providing light according to various embodiments of the present disclosure.

As shown in FIG. 7, it is assumed that the length of time for providing the light is T, 4 auxiliary light sources switch on in turn to provide the light; the width of a square wave pulse signal PC1 that lights auxiliary light source P1 is t1, the brightness waveform of P1 is PL1; the width of a square wave pulse signal PC2 that lights auxiliary light source P2 is t2, the brightness waveform of P2 is PL2; the width of a square wave pulse signal PC3 that lights auxiliary light source P3 is t3, the brightness waveform of P3 is PL3; the width of a square wave pulse signal PC4 that lights auxiliary light source P4 is t4, the brightness waveform of P4 is PL4; t1+t2+t3+t4=T, the brightness waveform obtained by superimposing PL1, PL2, PL3 and PL4 is PL1234. According to various embodiments, t1=t2=t3=t4.

Figure 8:
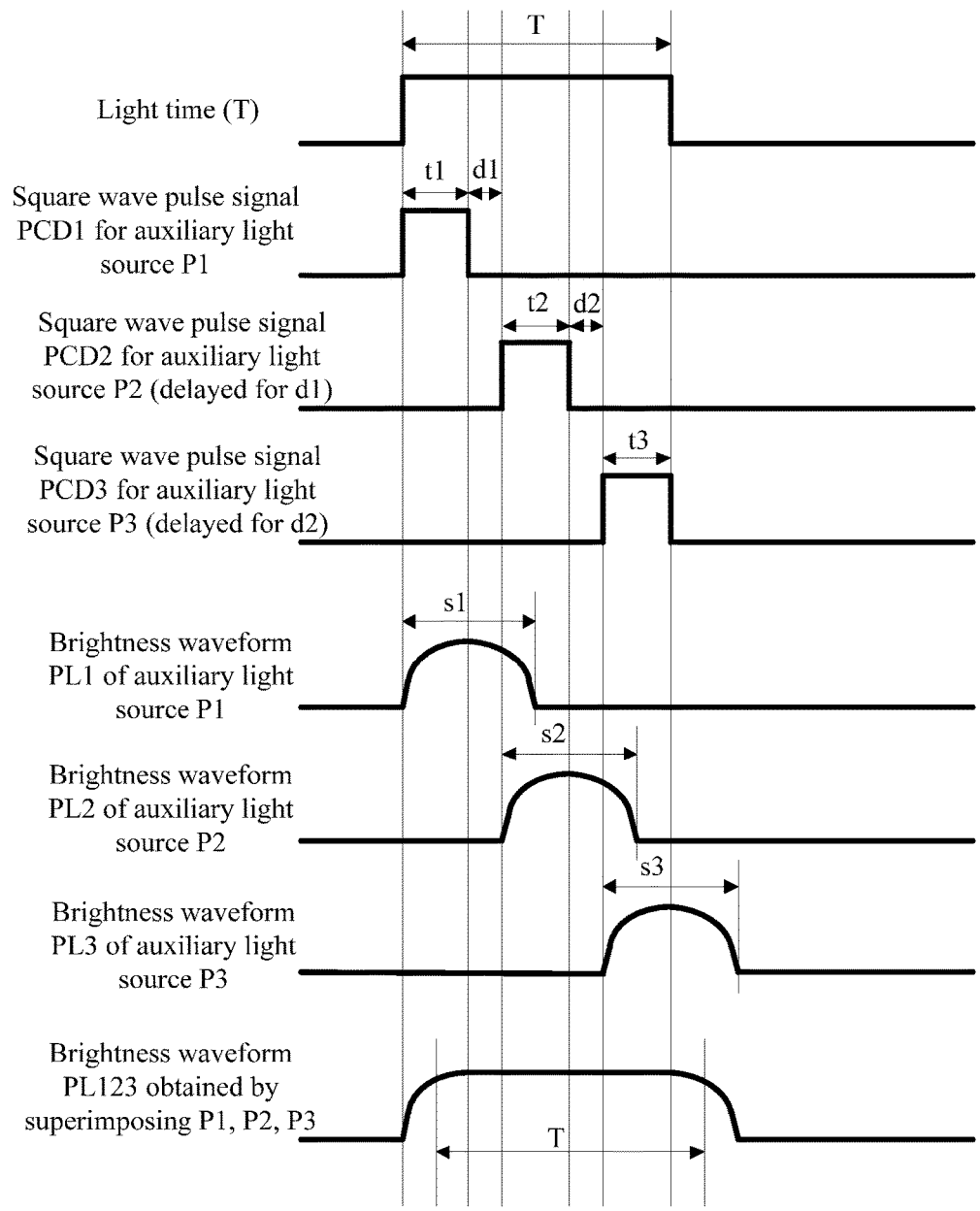
FIG. 8 is a diagram illustrating a method of providing light in accordance with examples of the present disclosure according to various embodiments.

FIG. 8 is a diagram illustrating a method of providing light according to various embodiments of the present disclosure.

As shown in FIG. 8, it is assumed that the time length of providing the light is T. A first square wave pulse signal PCD1 having a width of t1 is generated for auxiliary light source P1 and the brightness waveform of P1 is turned on by a sine wave pulse signal converted from PCD1 is PL1. After a delay of d1, since PCD1 ended, a second square wave pulse signal PCD2 having a width of t2 is generated for auxiliary light source P2 and the brightness waveform of P2 turned on by a sine wave pulse signal converted from PCD2 is PL2. After a delay of d2, since PCD2 ended, a third square wave pulse signal PCD3 having a width of t3 is generated for auxiliary light source P3 and the brightness waveform of P3 is turned on by a sine wave pulse signal converted from PCD3 is PL3. The brightness waveform obtained by superimposing PL1, PL2 and PL3 is denoted by PL123. According to various embodiments, t1=t2=t3, d1=d2.

It can be seen that the mechanism of FIG. 8 uses less auxiliary light sources than that of FIG. 7 and also satisfies the requirements for the light and, thus, uses light sources sparingly.

Various examples also provide an HD camera which may include a high frame rate CMOS sensor and at least one auxiliary light source having a duty cycle.

The high frame rate CMOS sensor is configured to capture images, and provide light to every N consecutive frame images with an interval of M consecutive frame images in the captured images using the auxiliary light source when the auxiliary light source is lit. The M is 0 or a positive integer, the N is a positive integer.

The high frame rate CMOS sensor may provide the light to a region of interest in each frame image.

The high frame rate CMOS sensor may use one auxiliary light source to provide the light to the region of interest in each frame image or use P auxiliary light sources, which switch on in turn to provide the light to the region of interest in each frame image, or use an auxiliary light source having P sub light sources, which switch on in turn to provide the light to the region of interest in each frame image. The P is an integer larger than 1.

The HD camera may also include a driving module.

The driving module is configured to light a first auxiliary light source in two auxiliary light sources, which turn on successively using a first square wave pulse signal and light a second auxiliary light source in the two auxiliary light sources, which turn on successively using a second square wave pulse signal when the first square wave pulse signal ends or light a first sub light source in two sub light sources, which successively turn on using a first square wave pulse signal and light a second sub light source in the two successively turned on sub light sources using a second square wave pulse signal when the first square wave pulse signal ends.

Alternatively, the driving module is configured to light a first auxiliary light source in two auxiliary light sources, which turn on successively using a first sine wave pulse signal and light a second auxiliary light source in the two auxiliary light sources, which turn on successively using a second sine wave pulse signal when there is a first pre-set length of time before the first sine wave pulse signal ends or light a first sub light source in two successively turned on sub light sources using a first sine wave pulse signal and light a second sub light source in the two successively turned on sub light sources using a second sine wave pulse signal when there is a first pre-set length of time before the first sine wave pulse signal ends.

The driving module may generate a first square wave pulse signal, convert the first square wave pulse signal into a first sine wave pulse signal, and light the first auxiliary light source using the first sine wave pulse signal. The driving module may also generate a second square wave pulse signal after a second pre-set length of time since the first square wave pulse signal ended, convert the second square wave pulse signal into a second sine wave pulse signal, and light the second auxiliary light source using the second sine wave pulse signal. The width of the first sine wave pulse signal is the sum of the width of the first square wave pulse signal and the first pre-set length of time and the second pre-set length of time.

The driving module may generate a first square wave pulse signal, convert the first square wave pulse signal into a first sine wave pulse signal, and light the first sub light source using the first sine wave pulse signal. The driving module may also generate a second square wave pulse signal after a second pre-set length of time since the first square wave pulse signal ended, convert the second square wave pulse signal into a second sine wave pulse signal, and light the second sub light source using the second sine wave pulse signal. The width of the first sine wave pulse signal is the sum of the width of the first square wave pulse signal and the first pre-set length of time and the second pre-set length of time.

In practice, in addition to the high frame rate CMOS sensor, the driving module, and the at least one auxiliary light source, the HD camera may also include other components which are not described because they are not related to the above mechanism.

According to the mechanism, images are captured using a high frame rate CMOS sensor so that the time difference between the readout time of the top of a frame image and the readout time of the bottom of the frame image is very small, thus there is little deformation of moving objects.

Further, some frame images are selected from the images captured by the high frame rate CMOS sensor at intervals and light is provided to the selected frame images using at least one auxiliary light source having a duty cycle when the auxiliary light source is lit. The auxiliary light source is turned on only when there is the need to provide the light, and may be in a low-light state at other time, i.e., it is not necessarily always lit. As such, the auxiliary light source is more durable and will not be broken in a short time period, thus, the performance of providing light is improved.

In addition, examples may also use plural auxiliary/sub light sources which switch on in turn to provide the light, which further prolongs the lifespan of the light sources and improves the performance of providing light.

Furthermore, the mechanism uses the commonly-used CMOS sensor under the exposure mode of rolling shutter, thus, the production costs are low.

In practice, the HD camera according to various embodiments may be used in the intelligent traffic industry for monitoring vehicles or the like. The HD camera may also be used in other monitoring scenarios. Thus, the HD camera is widely applicable.

The foregoing descriptions are only preferred embodiments of this invention and are not for use in limiting the protection scope thereof. Any modification, equivalent replacement and improvement made under the principle of the present invention should be included in the protection scope thereof.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

What is claimed is:

1. A method of a high definition (HD) camera, comprising:
    capturing plural frame images using a complementary metal oxide semiconductor (CMOS) sensor of high frame rate;
    providing light to N consecutive frame images of said plural frame images with an interval of M consecutive frame images using an auxiliary light source controlled to turn on and off in accordance with a duty cycle of a pulse wave signal;
    wherein
        the M is 0 or a positive integer, the N is a positive integer;
    providing the light to the N consecutive frame images comprises: providing the light to a region of interest in the frame images;
        providing the light to the region of interest in the frame images comprises:
            using an auxiliary light source to provide the light to the region of interest in the frame images;
            using P auxiliary light sources which switch on in turn to provide the light to the region of interest in the frame images; wherein the P is a positive integer larger than 1; or using an auxiliary light source including P sub light sources which switch on in turn to provide the light to the region of interest in the frame images; wherein the P is a positive integer larger than 1;

the using P auxiliary light sources which switch on in turn to provide the light to the region of interest in the frame images comprises: turning on a first auxiliary light source in two auxiliary light sources which turn on successively using a first sine wave pulse signal, and turning on a second auxiliary light source in the two auxiliary light sources which turn on successively using a second sine wave pulse signal when there is a first pre-set length of time before a first square wave pulse signal ends;

the using P sub light sources which switch on in turn to provide the light to the region of interest in the frame images comprises: turning on a first sub light source in two sub light sources which turn on successively using the first sine wave pulse signal, and turning on a second sub light source in the two sub light sources which turn on successively using the second sine wave pulse signal when there is a first pre-set length of time before the first square wave pulse signal ends; and turning on a first auxiliary light source using the first sine wave pulse signal and turning on a second auxiliary light source using the second sine wave pulse signal when there is a first pre-set length of time before the first sine wave pulse signal ends comprises:

generating the first square wave pulse signal, converting the first square wave pulse signal into the first sine wave pulse signal, and turning on the first auxiliary light source using the first sine wave pulse signal; generating a second square wave pulse signal after a second pre-set length of time since the first square wave pulse signal ended, converting the second square wave pulse signal into the second sine wave pulse signal, and turning on the second auxiliary light source using the second sine wave pulse signal; a width of the first sine wave pulse signal is a sum of the width of the first square wave pulse signal and the first pre-set length of time and the second pre-set length of time; and turning on a first sub light source using the first sine wave pulse signal and turning on a second sub light source using the second sine wave pulse signal when there is a first pre-set length of time before the first sine wave pulse signal ends comprises generating the first square wave pulse signal, converting the first square wave pulse signal into the first sine wave pulse signal, and turning on the first sub light source using the first sine wave pulse signal; generating the second square wave pulse signal after a second pre-set length of time since the first square wave pulse signal ended, converting the second square wave pulse signal into the second sine wave pulse signal, and turning on the second sub light source using the second sine wave pulse signal; the width of the first sine wave pulse signal is the sum of the width of the first square wave pulse signal and the first pre-set length of time and the second pre-set length of time.

2. The method of claim 1, wherein the using P auxiliary light sources which switch on in turn to provide the light to the region of interest in the frame images comprises: turning on a first auxiliary light source in two auxiliary light sources which turn on successively using the first square wave pulse signal, and turning on a second auxiliary light source in the two auxiliary light sources which turn on successively using the second square wave pulse signal when the first square wave pulse signal ends;

the using P sub light sources which switch on in turn to provide the light to the region of interest in the frame images comprises: turning on a first sub light source in two sub light sources which turn on successively using the first square wave pulse signal, and turning on a second sub light source in the two sub light sources which turn on successively using the second square wave pulse signal when the first square wave pulse signal ends.

3. The method of claim 1, wherein the duty cycle of the auxiliary light source equals a proportion of N to a sum of N and M.

4. A high definition (HD) camera, comprising:

a complementary metal oxide semiconductor (CMOS) sensor of high frame rate;

the high frame rate CMOS sensor is configured to capture images, receive light provided by an auxiliary light source controlled by at least one pulse wave signal to turn on and off according to a duty cycle, provide the light to N consecutive frames with an interval of M consecutive frames in the captured images when the auxiliary light source is on; the M is 0 or a positive integer, the N is a positive integer;

wherein the light is provided to a region of interest in each frame;

the CMOS sensor is configured to receive the light provided by one auxiliary light source to the region of interest in each frame; or receive the light provided by P auxiliary light sources which switch on in turn to provide the light to the region of interest in each frame; or receive the light provided by an auxiliary light source having P sub light sources which switch on in turn to provide the light to the region of interest in each frame, wherein the P is an integer larger than 1;

the HD camera further comprising a driving module, the driving module is configured to:

turn on a first auxiliary light source in two auxiliary light sources which turn on successively which turn on successively using a first sine wave pulse signal, and turn on a second auxiliary light source in the two auxiliary light sources which turn on successively using a second sine wave pulse signal when there is a first pre-set length of time before the first sine wave pulse signal ends; or to turn on a first sub light source in two sub light sources which turn on successively using the first sine wave pulse signal, and turn on a second sub light source in the two turned on sub light sources using the second sine wave pulse signal when there is a first pre-set length of time before the first sine wave pulse signal ends; and the driving module is configured to:

generate a first square wave pulse signal, convert the first square wave pulse signal into the first sine wave pulse signal, and turn on the first auxiliary light source using the first sine wave pulse signal; generate a second square wave pulse signal after a second pre-set length of time since the first square wave pulse signal ended, convert the second square wave pulse signal into the second sine wave pulse signal, and turn on the second auxiliary light source using the second sine wave pulse signal; a width of the first sine wave pulse signal is a sum of the width of the first square wave pulse signal and the first pre-set length of time and the second pre-set length of time; or generate a first square wave pulse signal, convert the first square wave pulse signal into the first sine wave pulse signal, and turn on the first sub light source using the first sine wave pulse signal; generate a second square wave pulse signal after a second pre-set length of time since the first square wave pulse signal ended, convert the second square wave pulse signal into the second sine wave pulse signal, and turn on the second sub light source using the second sine wave pulse signal; the width of the first sine wave pulse signal is the sum of the width of the first square wave pulse signal and the first pre-set length of time and the second pre-set length of time.

5. The HD camera of claim 4, further comprising:
a driving module;
the driving module is configured to turn on a first auxiliary light source in two auxiliary light sources which turn on successively which turn on successively using a first square wave pulse signal, and turn on a second auxiliary light source in the two auxiliary light sources which turn on successively using a second square wave pulse signal when first the square wave pulse signal ends; or
turn on a first sub light source in two sub light sources which turn on successively using a first square wave pulse signal, and turn on a second sub light source in the two sub light sources using a second square wave pulse signal when the first square wave pulse signal ends.

6. The HD camera of claim 4, wherein the duty cycle of the auxiliary light source equals a proportion of N to a sum of N and M.

7. A method of a high definition (HD) camera, comprising:
capturing plural frame images using a complementary metal oxide semiconductor (CMOS) sensor of high frame rate;
providing light of P auxiliary light sources to N consecutive frame images of said plural frame images with an interval of M consecutive frame images;
wherein the P is a positive integer larger than 1, M is 0 or a positive integer, the N is a positive integer;
controlling the P auxiliary light source to turn on and off successively using P pulse wave signals;
wherein controlling the P auxiliary light source to turn on and off successively using P pulse wave signals comprises
generating a first square wave pulse signal, converting the first square wave pulse signal into a first sine wave pulse signal, and turning on a first auxiliary light source of the P auxiliary light source using the first sine wave pulse signal, wherein there is a first pre-set length of time before the first square wave pulse signal ends; generating a second square wave pulse signal after a second pre-set length of time since the first square wave pulse signal ended, converting the second square wave pulse signal into a second sine wave pulse signal, and turning on a second auxiliary light source of the P auxiliary light source using the second sine wave pulse signal; a width of the first sine wave pulse signal is the sum of a width of the first square wave pulse signal and the first pre-set length of time and the second pre-set length of time.

8. The method of claim 7, wherein the P auxiliary light sources are P individual light sources or P sub light sources in a light source.

* * * * *